(12) United States Patent
Read

(10) Patent No.: US 12,717,295 B2
(45) Date of Patent: Aug. 25, 2026

(54) SYSTEMS AND METHODS FOR USING MEMORY-MAPPED MEMORIES IN A MICROCONTROLLER-BASED INSTRUMENT

(71) Applicant: Schneider Electric Systems USA, Inc., Foxboro, MA (US)

(72) Inventor: Brooks Read, Foxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 349 days.

(21) Appl. No.: 18/374,112

(22) Filed: Sep. 28, 2023

(65) Prior Publication Data

US 2024/0118671 A1 Apr. 11, 2024

Related U.S. Application Data

(60) Provisional application No. 63/414,637, filed on Oct. 10, 2022.

(51) Int. Cl.
*G05B 19/042* (2006.01)

(52) U.S. Cl.
CPC .................... *G05B 19/0426* (2013.01); *G05B 2219/25257* (2013.01)

(58) Field of Classification Search
CPC ...... G05B 19/0426; G05B 2219/25257; G05B 19/042; G06F 15/7807; G06F 12/023
See application file for complete search history.

(56) References Cited

U.S. PATENT DOCUMENTS

2014/0136738 A1 5/2014 Matlock et al.
2015/0293880 A1 10/2015 Yoon et al.
2019/0096813 A1* 3/2019 Lesea ...................... H01L 23/50
2020/0161247 A1* 5/2020 Lesea .................. G06F 15/7892
2022/0327009 A1* 10/2022 Beard ................. G06F 15/7807
2023/0353425 A1* 11/2023 Rollet ..................... H04L 69/18

OTHER PUBLICATIONS

STM32L4+—OctoSPI; OctoSPI interface Revision 2.0; presentation of the STM32 OctoSPI interface.
Foreign Office Action issued in EP 23202693.0, mailed Sep. 11, 2025, 7 pages.

* cited by examiner

*Primary Examiner* — Zhipeng Wang
(74) *Attorney, Agent, or Firm* — FIG. 1 Patents

(57) ABSTRACT

Systems and methods for using memory-mapped memories in a microcontroller-based instrument are provided herein. The method includes operating the microcontroller-based instrument using a complex application or protocol and operating a highly integrated, low-power microcontroller unit (MCU). The MCU is configured to use memory mapping for accessing at least one off-MCU memory connected to the MCU by at least one interface. The MCU's memory-mapping configuration enables the off-MCU memory(ies) to behave as an extension of at least one on-MCU memory that is connected directly to the CPU to effectively extend a range of the at least one on-MCU memory, wherein the effective extended range of the at least one on-MCU memory enables the microcontroller-based instrument to utilize the complex application or protocol. The method further includes writing addresses and/or data to and/or reading addresses and/or data from the off-MCU memory using serial transmission during a memory mapped transaction.

20 Claims, 4 Drawing Sheets

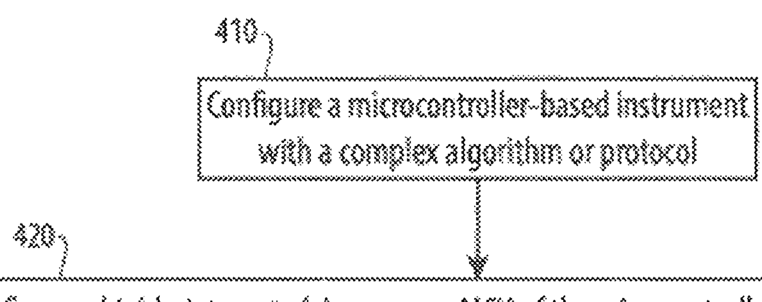

420

Configure a highly-integrated, low-power MCU of the microcontroller-based instrument to use memory mapping for accessing an MCU memory connected to a CPU of the MCU by at least one interface, wherein the MCU's memory-mapping configuration enables the off-MCU memory to behave as an extension of at least one on-MCU memory that is connected directly to the CPU to effectively extend a range of the at least one on-MCU memory, wherein the effective extended range of the at least one on-MCU memory enables the MCU to use the complex application or protocol, including:

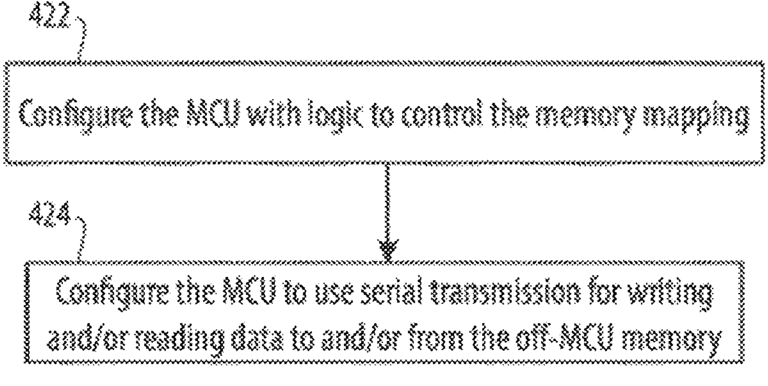

Fig. 4

SYSTEMS AND METHODS FOR USING MEMORY-MAPPED MEMORIES IN A MICROCONTROLLER-BASED INSTRUMENT

CROSS REFERENCE TO RELATED APPLICATIONS

This application claims priority to U.S. Provisional Patent Application Ser. No. 63/414,637 filed Oct. 10, 2022, which is incorporated herein by reference in its entirety.

TECHNICAL FIELD

This disclosure relates generally to instruments, and more particularly, to systems and methods relating to using memory-mapped memories in a microcontroller-based instrument.

BACKGROUND

As is known, an industrial system (e.g., an industrial operation or plant) typically includes a plurality of industrial equipment. The industrial equipment can come in a variety of forms and may be associated with various processes, for example, depending on the industrial system. For example, an industrial system may include one or more field devices (e.g., remote terminal units (RTUs), programmable logic controllers (PLCs), actuators, sensors, human-machine interfaces (HMIs)) that are used perform, analyze and/or control process variable measurements. These process variable measurements may include pressure, flow, level, and temperature, for example. The industrial system, and its associated equipment and process(es), may be operated and controlled using a distributed control system (DCS) in some instances.

The industrial equipment can be or include microcontroller-based instruments. One or more of these instruments can have a highly integrated, low-power microcontroller unit (MCU). The MCU can have limited on-MCU memory and can be restricted to a small footprint.

There is a need for industrial systems to have access to a platform-agnostic standard that can be used to access the cloud. One such standard is OPC® Unified Architecture (OPC UA®), which is an Ethernet-based cross-platform, open-source standard configured for data exchange from industrial equipment to cloud applications developed by the OPC Foundation®. However, OPC UA requires resources that are not available to highly integrated, low-power MCUs. For example, OPC UA requires a larger range of memory than is available to highly integrated, low-power MCUs. This disparity between requirements for adapting OPC-OA and specifications for highly integrated, low-power MCUs interferes with adaptation of OPC-OA in industrial systems that use highly integrated, low-power MCUs.

While conventional methods and systems have generally been considered satisfactory for their intended purpose, there is still a need in the art for a system and method to provide a modification that would enable a microcontroller-based instrument that has a highly integrated, low-power MCU to use OPC UA and reap advantages available by adopting this standard.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for using a memory-mapped memory in a microcontroller-based instrument. The method includes operating a microcontroller-based instrument using a complex application or protocol and operating a highly integrated, low-power microcontroller unit (MCU) of the microcontroller-based instrument. The MCU is configured to use memory mapping for accessing at least one off-MCU memory connected to a central processor unit (CPU) of the MCU by at least one interface. The MCU's memory-mapping configuration enables the at least one off-MCU memory to behave as an extension of at least one on-MCU memory that is connected directly to the CPU to effectively extends a range of the at least one on-MCU memory, wherein the effective extended range of the at least one on-MCU memory enables the microcontroller-based instrument to utilize the complex application or protocol. The method further includes writing addresses and/or data to and/or reading addresses and/or data from the at least one off-MCU memory using serial transmission during a memory mapped transaction.

In one or more embodiments, the complex application or protocol can be open platform communications unified architecture (OPC UA).

In one or more embodiments, the method can further include operating the MCU to control the microcontroller-based instrument to perform at least one of sensing a physical property, controlling and/or monitoring one or more devices that are external to the microcontroller-based instrument, actuating one or more second devices that are external to the microcontroller-based instrument, and communicating with one or more different microcontroller-based instruments of a first network and with a second network to which the MCU is connected. In one or more embodiments, the MCU can be deployed on a single chip.

In one or more embodiments, the microcontroller-based instrument can be deployed in an industrial network.

In one or more embodiments, data can be read from and/or written to the at least one off-MCU memory using bus-cycle access.

In one or more embodiments, the method can further include receiving power for all or a majority of electrical and electronic components of the microcontroller-based instrument via power sourced from an Ethernet connection of the microcontroller-based instrument.

In accordance with another aspect of the disclosure, a method is provided for configuring a microcontroller-based instrument. The method includes configuring the microcontroller-based instrument with a complex application or protocol and configuring a highly-integrated, low-power MCU of the microcontroller-based instrument to use memory mapping for accessing at least one off-MCU memory connected to a CPU of the MCU by at least one interface, wherein the MCU's memory-mapping configuration enables the at least one off-MCU memory to behave as an extension of at least one on-MCU memory that is connected directly to the CPU to effectively extend a range of the at least one on-MCU memory, and wherein the effective extended range of the at least one on-MCU memory enables the microcontroller-based instrument to utilize the complex application or protocol. Configuring the MCU includes configuring the MCU with logic to control the memory mapping and configuring the MCU to use serial transmission of for writing and/or reading addresses and/or data to and from the off-MCU memory.

In one or more embodiments, the complex application or protocol can be an open platform communications unified architecture (OPC UA).

In one or more embodiments, the MCU can be configured at boot-time or before a first access by the MCU to the at least one off-MCU memory.

In accordance with still another aspect of the disclosure, a microcontroller-based instrument is provided. The instrument includes an instrument module for performing an instrument task using complex application or protocol and a highly integrated, low-power MCU configured to use the complex application or protocol. The MCU includes a central processing unit (CPU), at least one on-MCU memory directly connected to the CPU by an on-MCU data path, at least one on-MCU memory-mapped mode peripheral interface connected via the on-MCU data path to the CPU and configured to control memory mapping for writing addresses and/or data to and reading addresses and/or data from at least one off-MCU memory using serial transmission, and a plurality of ports via which the addresses, the data, and control signals are exchanged via serial transmission with the at least one off-MCU memory during memory mapped transactions. The memory-mapping is controlled to enable the at least one off-MCU memory to behave as an extension of the at least one on-MCU memory, and to effectively extend a range of the at least one on-MCU memory, wherein the effective extended range of the at least one on-MCU memory enables the MCU to use the complex application or protocol. The microcontroller-based instrument further includes the at least one off-MCU memory, which is coupled to the CPU via the at least one interface and the plurality of ports.

In one or more embodiments, the complex application or protocol can be an open platform communications unified architecture (OPC UA).

In one or more embodiments, the instrument module can include at least one of a sensor circuit configured to sense a physical property, a controller or monitor circuit configured to control or monitor one or more devices that are external to the microcontroller-based instrument, an actuator circuit configured to actuate one or more second devices that are external to the microcontroller-based instrument, and an edge device configured to communicate with one or more different devices of a first network and with a second network to which the MCU is connected.

In one or more embodiments, the MCU can be deployed on a single chip.

In one or more embodiments, the microcontroller-based instrument can be deployed in an industrial network.

In one or more embodiments, the at least one on-MCU memory includes on-MCU read-only memory (ROM) and on-MCU read-write memory (RAM), and the at least one off-MCU memory includes off-MCU ROM that increases the capacity of the on-MCU ROM to about 64 Mbyte or more and off-MCU RAM that increases the capacity of the on-MCU RAM to about 8.0 Mbyte or more.

In one or more embodiments, the at least one off-MCU memory can include off-MCU ROM and off-MCU RAM, and memory mapped transactions between the at least one on-MCU memory and the at least one off-MCU memory for reading addresses and/or data from the off-MCU ROM can use no more than eleven input/output pins of the MCU and for reading and writing addresses and/or data to and from the off-MCU RAM can use no more than eleven input/output pins of the MCU.

In one or more embodiments, the at least one off-MCU memory can include an off-MCU RAM and an off-MCU ROM, and the at least one interface can include a first interface that can connect the CPU to the off-MCU ROM and a second interface that can connect the CPU to the off-MCU RAM.

BRIEF DESCRIPTION OF THE DRAWINGS

The foregoing features of the disclosure, as well as the disclosure itself may be more fully understood from the following detailed description of the drawings, in which:

FIG. 4 illustrates a method of configuring a microcontroller-based instrument with memory mapping for off-MCU memory, in accordance with embodiments of the disclosure.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
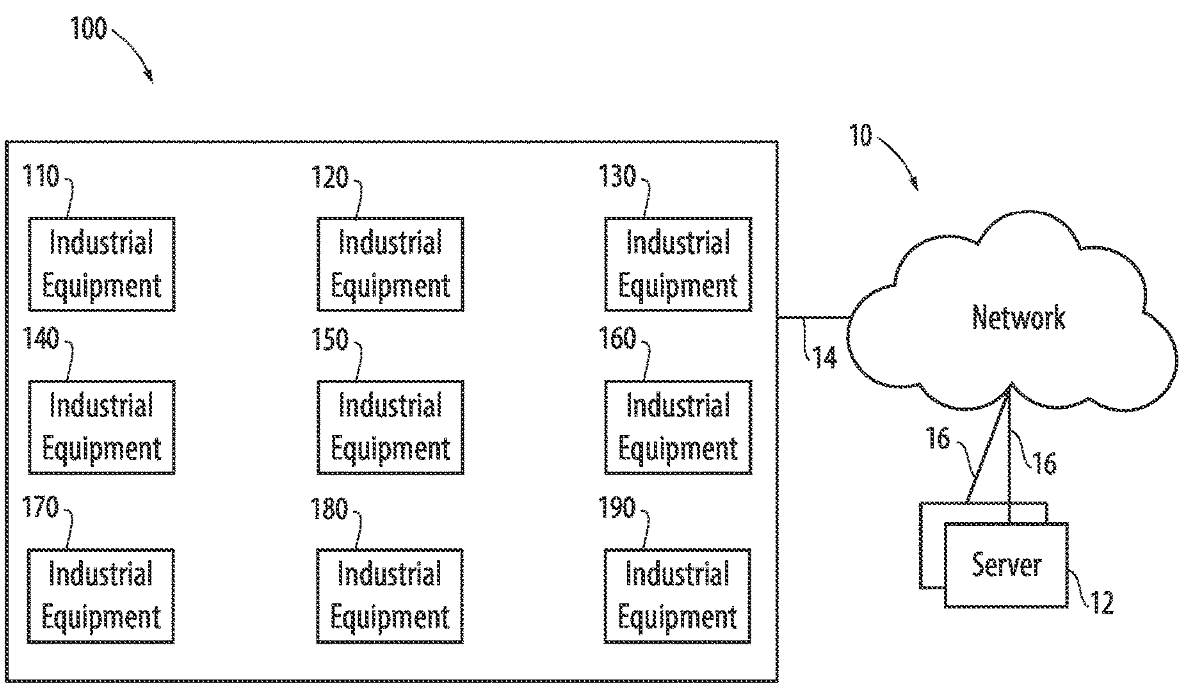
FIG. 1 is a schematic diagram showing an example industrial system in accordance with embodiments of the disclosure.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification are collected here.

As used herein, the term "edge device" is used to refer to a boundary point (versus a waypoint) device connected at the periphery of a network.

As used herein, the term "field device" is used to refer to intelligent field instruments with embedded control, compute, and/or measurement capabilities implemented on lower power embedded microcontroller-based platforms.

As used herein, the term "machine learning (ML)" is used to refer to the use and development of software that is able to learn and adapt without following explicit instructions, by using algorithms and statistical models to analyze and draw inferences from patterns in data.

As used herein, the term "embedded system" is used to refer to a combination of a microcontroller, memory, and input/output peripherals—that has a dedicated function within a larger system.

As used herein, the term "network" is used to refer to an infrastructure for connecting devices for data communication via wired and/or wireless connections. Depending on the context, the term "network" can refer to the infrastructure or to the devices that are connected.

As used herein, the term "high availability" is used to refer to a device or application that can operate at a high level, continuously, without intervention, for a given time period. High-availability infrastructure is configured to deliver quality performance and handle different loads and failures with minimal or zero downtime.

As used herein, the term "intrinsically safe (IS)" is used to refer to an approach to the design of equipment going into hazardous areas that reduces the available energy to a level where it is too low to cause ignition as certified by per IEC TS 60079-39 or ATEX.

As used herein, the term "chip" is used to refer to an electronic circuit manufactured on a monolithic semiconductor substrate and encased in a package with interconnection terminals.

Disclosed herein are systems and methods for providing a microcontroller-based instrument with on-MCU memories that are disposed on a same chip as a central processor unit (CPU) of a microcontroller unit (MCU) of the instrument, and off-MCU memories that are memory-mapped to the CPU via an interface and are disposed on a different chip than the MCU and its contained CPU. Each of the on-MCU and off-MCU memories can include both volatile and non-volatile memories in accordance with some embodiments.

The MCU can be highly integrated, low-power, and have a small footprint, which is generally ideal for use in non-line powered industrial instruments. However, on-MCU memories can be insufficient for certain applications or protocols (one example is OPC® Unified Architecture (OPC UA®)). Capacity of on-MCU memories could be increased for use with such complex applications or protocols by extending the on-MCU memories using off-MCU memories that use programmatic techniques (versus a bus-cycle access via memory-mapping) for accessing the off-MCU memories. Such non-memory mapped memories would be connected using an interface, such as a serial peripheral interface (SPI), inter-integrated circuit (IIC), or other industry standard low pin count interface without memory mapped access implemented in the connected chip interfaces. This non-memory mapped extended memories would add complex external memory access requirements, prohibiting direct implementation of industry standard applications (such as OPC UA). As a rule, MCUs do not support use of a full complement of parallel address and data lines to access conventional memory devices off-chip via memory mapped access, as such an interface would consume a large fraction of an MCU's constrained I/O pins. Instead, pin use can be minimized by using serial devices with memory mapping interfaces to reduce pin count, albeit by applying complex programmatic techniques that are customized for each memory mapping solution.

In accordance with embodiments of this disclosure, off-MCU, memory-mapped memories include read-only memory (ROM, commonly embodied as read-only flash memory) and random-access memory (RAM, also referred to as read-write memory) can be used to overcome this limitation. In particular, the disclosed systems and methods extend microcontroller on-MCU memories using memory-mapped off-MCU read-only memory (ROM) and read-write memory (RAM) so that a complex application or protocol, such as OPC-UA, can be realized using an inexpensive microcontroller.

In one example implementation of the disclosed invention, a memory mapped-mode peripheral interface is provided that enables memory mapping with each of off-MCU ROM and RAM. An example memory mapped-mode peripheral interface is an OctoSPI® interface. The memory mapped-mode peripheral interface is connected to compatible off-MCU memory devices. The memory mapped-mode peripheral interface and off-MCU memories can be configured at system boot-time to subsequently operate in memory mapped mode. Operation in memory-mapped mode permits bus-cycle access to the off-MCU memories. In this way, the memories operate as if they are part of the on-MCU memory. In other words, this enables the off-MCU memories to behave as an extension of the on-MCU memory. Bus-cycle access means that the memory device responds to CPU read and write cycles by returning the value at the addressed location for a read cycle or writing to the addressed location for a write cycle. This allows, for example, direct execution of code from the external memories. Absent the memory mapped interface, it would be necessary to programmatically move off-chip code to a memory-mapped location, then separately execute the code which had been so moved. This renders the implementation and execution of an application stored in an off-chip memory cumbersome at best.

It is understood that the disclosed systems and methods may be found suitable for use in numerous applications. The applications may include, for example, oil and gas, energy, food and beverage, water and wastewater, chemical, petrochemical, pharmaceutical, metal, and mining and mineral applications.

For purposes of explanation and illustration, and not limitation, a schematic diagram of an exemplary embodiment of an industrial system in accordance with the disclosure is shown in FIG. 1 and is designated generally by reference character 100. Other embodiments of the industrial system 100 in accordance with the disclosure, or aspects thereof, are provided in FIGS. 2-4, as will be described.

FIG. 1 shows example industrial system 100 having a plurality of industrial equipment 110, 120, 130, 140, 150, 160, 170, 180, 190. The industrial equipment (or devices) 110, 120, 130, 140, 150, 160, 170, 180, 190 may be associated with a particular application (e.g., an industrial application), applications, and/or process(es). The industrial equipment 110, 120, 130, 140, 150, 160, 170, 180, 190 may include electrical or electronic equipment, for example, such as machinery associated with the industrial system 100 (e.g., a manufacturing or natural resource extraction operation). The industrial equipment 110, 120, 130, 140, 150, 160, 170, 180, 190 may also include the controls and/or ancillary equipment associated with the industrial system 100, for example, programmable logic controllers (PLCs), actuators, sensors, human-machine interfaces (HMIs)) that are used perform, analyze and/or control process variable measurements. In embodiments, the industrial equipment 110, 120, 130, 140, 150, 160, 170, 180, 190 may be installed or located in one or more facilities (i.e., buildings) or other physical locations (i.e., sites) associated with the industrial system 100. The facilities may correspond, for example, to industrial buildings or plants. Additionally, the physical locations may correspond, for example, to geographical areas or locations.

The industrial equipment 110, 120, 130, 140, 150, 160, 170, 180, 190 may each be configured to perform one or more tasks in some embodiments. For example, at least one of the industrial equipment 110, 120, 130, 140, 150, 160, 170, 180, 190 may be configured to produce or process one or more products, or a portion of a product, associated with the industrial system 100. Additionally, at least one of the industrial equipment 110, 120, 130, 140, 150, 160, 170, 180,

190 may be configured to sense or monitor one or more parameters (e.g., industrial parameters) associated with the industrial system 100. For example, industrial equipment 110 may include or be coupled to a temperature sensor configured to sense temperature(s) associated with the industrial equipment 110, for example, ambient temperature proximate to the industrial equipment 110, temperature of a process associated with the industrial equipment 110, temperature of a product produced by the industrial equipment 110, etc. The industrial equipment 110 may additionally or alternatively include one or more pressure sensors, flow sensors, level sensors, vibration sensors and/or any number of other sensors, for example, associated the application(s) or process(es) associated with the industrial equipment 110. The application(s) or process(es) may involve water, air, gas, electricity, steam, oil, etc. in one example embodiment.

The industrial equipment 110, 120, 130, 140, 150, 160, 170, 180, 190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110, 120, 130, etc. may each have independent functionality.

As discussed in the Background section of this disclosure, the industrial system 100, and its associated equipment and process(es), may be operated and controlled using a distributed control system (DCS) in some instances.

Industrial equipment 110, 120, 130, etc. can be connected to one or more cloud servers 12 via a network 10. Communication links 14 between industrial equipment 110, 120, 130, etc. and network 10 include a wired connection connected directly to the industrial equipment 110, 120, 130, etc. Communication links 14 can further include additional wired or wireless connections. The wired connection that is connected directly to industrial equipment 110, 120, 130, etc. can be an Ethernet connection. Communication links 16 between network 10 and cloud servers 12 can include wireless and/or wired connections.

Network 110 can include multiple networks, such as one or more local area networks (LANs) or wider area networks (WANs). The LANs and WANS can be a private, public, and/or virtual private networks, for example. Network 110 can include the Internet.

Cloud servers 112 are servers that are accessed via a network, such as network 110, and provide access to software and services that are executed on cloud servers 112. The services can include data storage, data aggregation, data analysis, ML training, ML analysis, control, monitoring, etc. Cloud servers 112 can be located in data centers all over the world. Industrial equipment 110, 120, 130, etc. and cloud servers 112 can be owned or controlled by the same business entity or by different business entities.

Industrial system 100 uses a platform-agnostic standard that allows industrial equipment 110, 120, 130, etc. to access cloud servers 112. One such platform is OPC UA. OPC UA is a cross-platform, open-source standard configured for data exchange from industrial equipment to cloud applications developed by the OPC Foundation®. Cloud servers 112 can provide these cloud applications as a service industrial system 100.

One or more of industrial equipment 110, 120, 130, 140, 150, 160, 170, 180, 190 can be or include microcontroller-based instruments. One or more of these instruments can have a highly integrated, low-power microcontroller unit (MCU). The MCU can have limited on-MCU memory and can be restricted to a small footprint.

However, OPC UA requires resources that are not currently available to highly integrated, low-power MCUs. For example, OPC UA requires a larger range of memory and a greater power source than is available to highly integrated, low-power MCUs. High integration of the microcomputer contributes to consumption of the limited power available, further constraining available power. This disparity between requirements for adapting OPC-OA and power availability of highly integrated, low-power MCUs interferes with adaptation of OPC-OA in industrial systems that use highly integrated, low-power MCUs.

Figure 2:
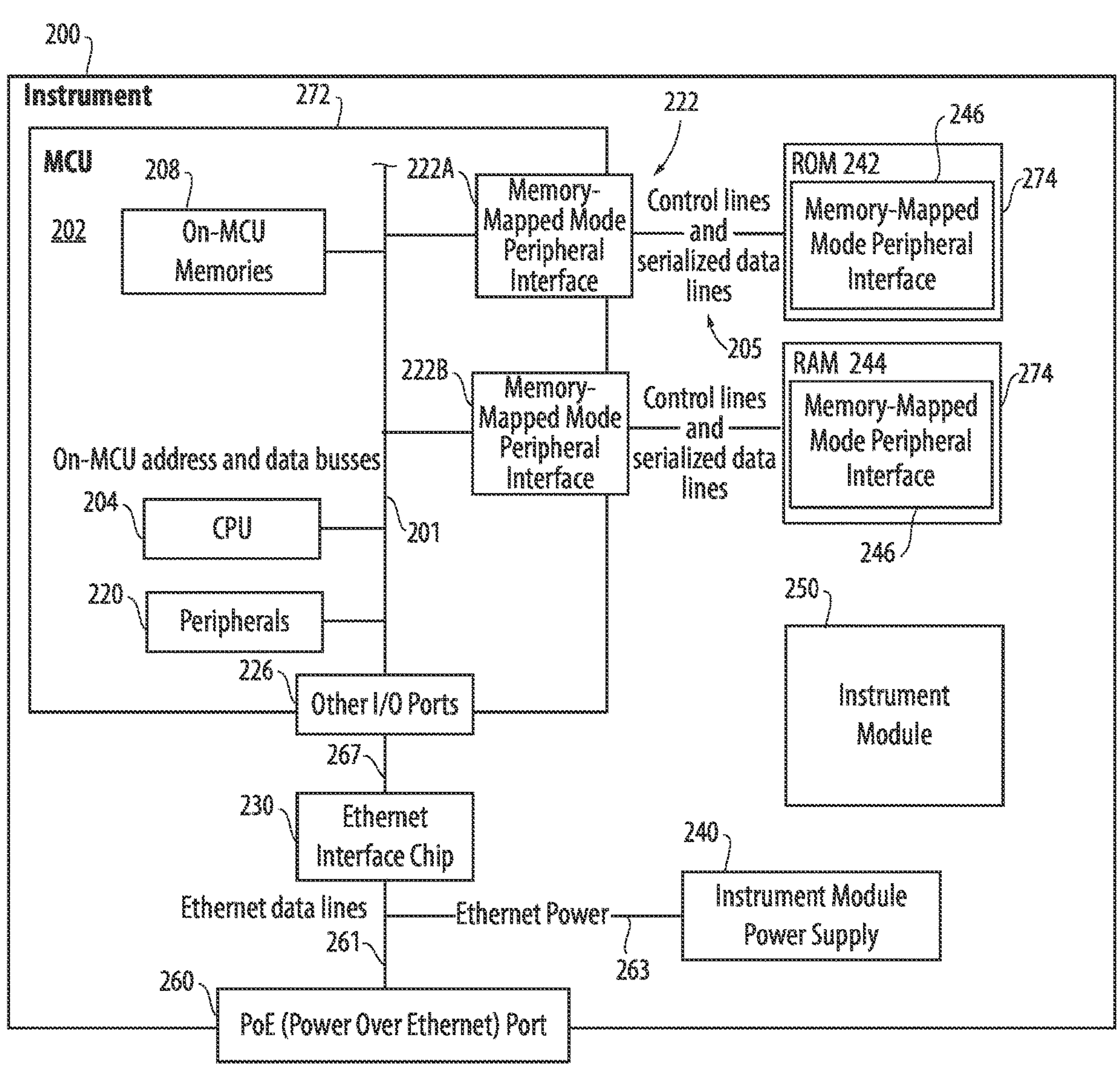
FIG. 2 is a block diagram of an example instrument of an industrial system, the instrument having a microcontroller unit with on-MCU memory and memory-mapped off-MCU memory, in accordance with embodiments of the disclosure.

FIG. 2 illustrates an example implementation of the disclosed invention for extending microcontroller on-MCU memory. The invention may be found suitable for use in microcontroller-based instruments, such as one of more of the industrial equipment 110, 120, 130, etc. discussed above in connection with FIG. 1. A microcontroller-based instrument having an extended on-MCU memory connected to its microcontroller using memory mapping enables the instrument to use OPC-OA. An industrial system, such as the industrial system 100 having industrial equipment 110, 120, 130 that are enabled to use OPC-UA would be enabled to reap the benefits provided by UPC-UA.

FIG. 2 is a schematic diagram of microcontroller-based instrument 200 (also referred to as instrument 200) having a microcontroller unit (MCU) 202, an ethernet interface chip 230, an instrument module power supply 240, off-MCU memories 242 and 244, an instrument module 250, and a power over Ethernet (PoE) port 260. Off-MCU memories 242 and 244 can also be referred to using a singular term "off-MCU memory".

MCU 202 can be disposed on a single chip 272. Ethernet interface chip 230, instrument module power supply 240, off-MCU memories 242 and 244, instrument module 250, and power over Ethernet (PoE) port 260 can be deployed on one or more chips 274 that are different than chip 272. Chips 272 and 274 can be deployed on a same circuit board.

An on-MCU device, such as on-MCU memories 208, can be directly connected to CPU 204, e.g., via address and data buses 201 without the need for an interface. The term "on-MCU" thus refers to at least one of being disposed on the same chip as MCU 102 and/or being directly connected to MCU 102 without the need for an interface.

Ethernet interface chip 230 is a circuit configured to manage the sending and receiving of data packets over an ethernet network. Instrument module power supply 240 manages power that is received via PoE port 260 and distributes it via power buses (not shown) to instrument module 250 and MCU 202. Power received via PoE port 260 can be used as the sole power source for instrument 200. It is also possible to provide further power, additional to the power received via PoE port 260, to be used for operation of instrument 200.

Instrument module 250 includes circuitry for instrument 200 to perform one or more specific functions. Instrument 200 can include, for example, a sensor device, an actuator, an HMI, electrical circuit or other ancillary equipment. Instrument module 250 includes the circuitry to perform the specific functions of instrument 200, for example and without limitation, control logic, switches, sensors (e.g., pressure, flow, level, vibration, temperature sensors, etc.), electrical or electronic equipment, user interfaces, machine interfaces, HMIs, etc.

PoE port 260 is a port coupling with an external source connected to the ethernet network for sending and receiving the data packets and receiving power.

MCU 202 includes a central processor unit (CPU) 204, on-MCU memories 208, peripherals 220, memory-mapped mode (MMM) peripheral interfaces 222 and other I/O ports 226. On-MCU address and data busses 201 are interconnections that provide communication pathways between CPU 204, on-MCU memories 208, peripherals 220, and other I/O ports 226. On-MCU address and data buses 201 are shown generally to illustrate that the illustrated components of MCU 202 are capable of communicating via on-chip conductors.

MCU 202 can include additional components (e.g., timers, clock generators, a direct memory access (DMA) controller, hardware accelerators, a floating-point accelerator, and miscellaneous other functional blocks (not shown). Furthermore, MCU 202 can include additional communication paths that are not shown for purposes of illustrative clarity. MCU 202 is a highly integrated, low-power device that can have a small footprint. MCU 202 can provide glueless or near-glueless interconnections between MCU 202 and any specialized devices used to implement functionality of the instrument function via other I/O ports 226. The term "glueless" refers to chip interconnections which are direct (just wires), without any supporting circuits to enable interconnection or adaption of interfaces. In addition, the integrated circuit includes other peripherals to provide the functionality of MCU 202, including, for example, dedicated hardware accelerators, encryption/decryption processors, DMA (direct memory access) controller, data converters (analog-to-digital and digital-to-analog), in-circuit debugging interface, counters and timers, and clock generators.

The term "on-MCU memory" refers to memory on the MCU chip that is directly connected to CPU 204 by address and data busses so that CPU 204 can directly access the on-MCU memory using memory bus cycles. For paths between CPU 204 and on-MCU memories 208, each address and data path bit has its own interconnect wire.

As a low power device, in one or more embodiments, all or a majority of electrical and electronic components of MCU 202 can be powered entirely by power received over PoE port 260, meaning all power supplied to MCU 202 is supplied by via PoE port 260, avoiding need for a separate power supply. Elimination of the need for a separate power supply simplifies use and installation of the device. In addition, low power consumption results in generation of less heat, and reduces or eliminates the need to make special provisions to avoid overheating of the device.

As a device having a small footprint, an integrated circuit that includes MCU 202 has a physical size that is small enough to be included in instrument 200 with substantially minimal or no detectable increase of dimensions of instrument 200. The high-integration of MCU 102 minimizes the need for off-MCU devices (meaning devices that are not physically located on a same chip as CPU 204. The off-MCU devices include off-MCU memories 242. A circuit board supporting MCU 202 and any off-MCU devices, including for example, ethernet interface chip 230, instrument module power supply 240, off-MCU memories 242 and 244, instrument module 250, and PoE port 260, can thus be minimized to a small footprint as well.

CPU 204 can be, for example an Arm Cortex-M33™ processor, without limitation to a specific processor. On-MCU memories 208 include read-only flash memory) and read-write memory. The read-only flash memory can be nonvolatile, and the read-write memory can be volatile memory.

On-MCU memories 208 can include one or more SRAM read-write memories and one or more read-only flash memories. Off-chip memories can exploit specialized circuit design—e.g., multilayered flash memories which can reach astronomical capacities, however such designs are not compatible with the CPU of typical MCUs and peripheral circuit manufacturing. Inherent lower limits for these memories would support basic functionality of MCU 202. In certain embodiments, for practical purposes the upper limit of the on-MCU read-write memory reaches about 0.75 Mbytes and the upper limit of the on-MCU read-only flash memory reaches about 2 Mbyte.

It is noted that these upper limits present a problem for an MCU based instrument when it comes to using a complex application or protocol. At present, the upper limits for on-MCU read-write memory and on-MCU read-only flash memory size are not enough to support functionality of instrument 100 when using a complex application or protocol, such as OPC UA. Even if these upper limits change over time, it still may not be enough to support functionality of instrument 100 when using a complex application or protocol.

The upper limits for off-MCU memory 242 can be far larger than for on-MCU memories 208, although they too may vary based on the environment and setting in which they are used. In fact, off-chip memories exist that can exploit specialized circuit design, e.g., multilayered flash memories which can reach astronomical capacities. However, such off-chip memories do not solve the problem of providing enough memory for an MCU-based instrument to support a complex application or protocol. This is because designs of such large capacity flash memories are not compatible with the CPU of a typical MCU and its peripheral circuit manufacturing.

With returned reference to FIG. 2, peripherals 220 can include various on-MCU components used by MCU 202, such as a SPI, an inter-integrated circuit (IIC) bus, a universal synchronous and asynchronous receiver-transmitter (USARTs), etc. Although shown separately in FIG. 2, peripherals 220 can support MMM peripheral interfaces 222.

By using the serial-transfer protocol for sequential transfer of information, a large number of address and data lines can be emulated while using a much smaller number of MCU interconnection pins. Traditional CPUs (microprocessors) achieve memory mapped access to off-CPU memories by devoting a large number of pins to interconnect a large number of address and data lines to off-CPU memory devices. For example, an 8-bit microprocessor typically interconnects to one or more off-CPU memory device(s) using 16 address lines for parallel addressing, eight data I/O lines, and several control lines (e.g., for chip select and write commands). In such traditional microprocessors, signals for each function (control message, timing message, address, data byte) are sent in parallel and simultaneously. In such a traditional CPU-based controller, all of the ancillary functions of an MCU (peripherals, memory, I/O ports, etc.) are implemented using chips external to the CPU chip.

On the other hand, an MCU with MMM peripheral interfaces 222 emulates a large number of address and data lines typically used to achieve memory mapped operation but does so using serial-transfer via a much smaller number of pins to sequentially transfer address, data, and control information. This conserves pins while enabling memory mapped operation. In this way, more pins are available to interface with other off-MCU circuits.

In accordance with one or more embodiments, MMM peripheral interfaces 222 include a total of eleven MCU package pins. Additionally, compatible off-MCU ROM memory 242 and off-MCU RAM 244 each require only eleven MCU interconnect pins (not shown). The eleven pins in each case can include eight pins for transmission of addresses and data and three pins for transmission of control signals.

MMM peripheral interfaces 222 can be configured to operate only in a memory-mapped mode or can be configured to operate in the memory-mapped mode in response to user selection (e.g., from a menu of different modes). Configuration of MCU 202 and/or MMM peripheral interfaces 222 can occur when MCU 202 is booted or before a first access by MCU 202 of off-MCU memory 242.

MCU 202 is manufactured with a fixed number of pins. Some of the fixed number of pins may be configured to route signals to the MMM peripheral interfaces 222. By reducing the number of pins included in MMM peripheral interfaces 222, more pins are available to be used by other I/O ports 226 and to interface with other off-MCU devices, e.g., of instrument module 250 and/or for supporting OPC UA.

A port (e.g., of the ports included in MMM peripheral interfaces 222 and in other I/O ports 226) can be a wire or pin that provides the ability to connect an on-MCU component disposed on a same chip as CPU 204 to an off-MCU component that is not disposed on the chip. Other I/O ports 226 are input/output interfaces that are available to support other functions of MCU 202, excluding at least the functions provided by the ports included in MMM peripheral interfaces 222. For example, other I/O ports 226 can be coupled to instrument module 250 for controlling and/or receiving data from instrument module 250, controlling actuators, turning external devices on/off, activating lights such as LEDs, or sensing inputs (such as switch positions).

On-MCU address and data busses 201 are physical data paths for flow of data between CPU 204 and other MCU circuits which depend on a state of these signals for their operation.

Off-MCU control and serialized data lines 205 are physical data paths, such as pins or wires, for flow of data, address, and control between MCU 202 and off-MCU memory 242. Examples of data that flows along control and serialized data lines 205 between off-MCU memories 242 and 244 (in either direction) can include control and timing signals, data, and addresses.

Off-MCU memory 242 includes off-MCU ROM memory 242 and off-MCU RAM 244, both of which are compatible with MMM peripheral interfaces 222. In one or more embodiments, off-MCU ROM 242 has a capacity of 64 Mbytes and off-MCU RAM 244 has a capacity of 8 Mbytes. The disclosure does not limit the capacity of off-MCU ROM 242 and off-MCU RAM 244, as these are selectable in accordance with needs and constraints of instrument 100.

Optionally, off-MCU ROM 242 can be preprogrammed according to needs of a particular application, such as some or all of an application implementing a complex application of protocol, such as OPC UA. It is noted that a portion of the application implementing the complex application or protocol. Off-MCU ROM 242 can be preprogrammed for the purpose of memory mapping or for the purpose of usage of the complex application or protocol by the microcontroller-based instrument 100. Off-MCU ROM 242 can be preprogrammed at manufacturing time and can be upgraded as needed, in the field. The upgrade can be sent to off-MCU ROM 242 over with MMM peripheral interfaces 222, e.g., using PoE.

Off-MCU ROM 242 and RAM 244 are memory-mapped such that MCU 202 can use read and write operations to access off-MCU ROM 242 and RAM 244 as if they were included in on-MCU memories 208. This effectually extends the range of on-MCU memories 208. By using memory mapping, MCU 202 can directly access off-MCU ROM 242 and RAM 244 using bus-cycle access. Content of memory mapped off-MCU ROM 242, and RAM 244 can be used by a microcontroller software developer as a direct extension to the on-MCU memories 208. For example, software development tools can be informed of the existence of the off-MCU ROM 242 and RAM 244, and then take into account the additional memory provided by off-MCU ROM 242 and RAM 244 with no added current or future work by the software developer.

On the other hand, accessing non-memory mapped off-MCU memories (e.g., SPI-attached memories) that increase the memory available to a microcontroller is not nearly as natural as accessing memory mapped memory for a variety of reasons. A SPI-attached memory that is not memory mapped cannot be seamlessly exploited by standard software development tools. Rather, special operations must be performed to exploit the off-MCU memory. Significant customized programming is needed for non-memory mapped, off-MCU memories, as a memory manipulation step is required to move off-MCU code and data into memory mapped locations (e.g., to on-chip memory). This enables making the off-MCU code executable and makes data references subject to direct access by executed instructions.

The additional step of moving off-MCU memory to a memory mapped location slows processing speed. For example, before being used, the off-MCU memory may need to be read into the microcontroller RAM a chunk at a time using a specialized program. In operation, the copying of chunked data consumes time and uses additional data buffers or memory space. Each read or write operation requires additional steps and access operations that consume time.

Figure 3:
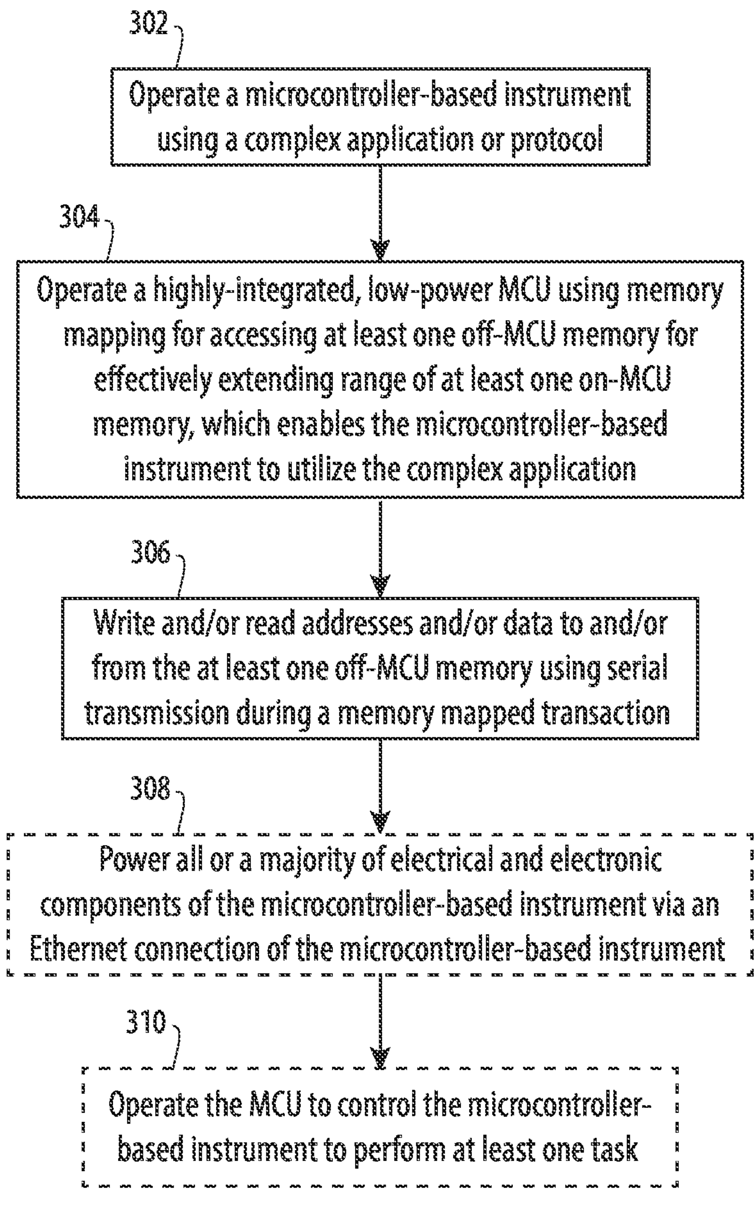
FIG. 3 illustrates a method of using a microcontroller-based instrument with memory mapping for off-MCU memory, in accordance with embodiments of the disclosure.

With reference now to FIGS. 3 and 4, shown are flowcharts demonstrating implementation of the various exemplary embodiments. It is noted that the order of operations shown in FIGS. 3 and 4 is not required, so in principle, the various operations may be performed out of the illustrated order. Also, certain operations may be skipped, different operations may be added or substituted, some operations may be performed in parallel instead of strictly sequentially, or selected operations or groups of operations may be performed in a separate application following the embodiments described herein.

With reference to a flowchart shown in FIG. 3, at operation 302, a microcontroller-based instrument (such as microcontroller-based instrument 200 shown in FIG. 2) is operated using a complex application or protocol. At operation 304, a highly integrated, low-power MCU (such as MCU 202 shown in FIG. 2) of the microcontroller-based instrument is operated using memory mapping for accessing at least one off-MCU memory that is connected to a CPU (e.g., CPU 204 shown in FIG. 2) of the MCU by at least one interface. This memory mapping configuration enables the at least one off-MCU memory to behave as an extension of at least one on-MCU memory that is connected directly to the CPU to effectively extend a range of the at least one on-MCU memory, and wherein the effective extended range of the at least one on-MCU memory enables the microcontroller-based instrument to utilize the complex application or protocol.

At operation 306, addresses and/or data are written to and/or read from the off-MCU memory using serial transmission during a memory mapped transaction. Optionally, at operation 308, all or a majority of electrical and electronic components of the chip are powered via an Ethernet connection of the chip. Optionally, at operation 310, the MCU is operated to control the microcontroller-based instrument to perform at least one task. The at least one task can include one or more of sensing a physical property, controlling and/or monitoring one or more devices that are external to the microcontroller-based instrument, actuating one or more second devices that are external to the microcontroller-based instrument, and communicating with one or more different microcontroller-based instruments of a first network and with a second network to which the MCU is connected (which can include behaving as an edge device).

With reference to a flowchart shown in FIG. 4, at operation 410, a microcontroller-based instrument is configured with a complex application or protocol. At operation 420, a highly integrated, low-power MCU of the microcontroller-based instrument is configured to use memory mapping for accessing at least one off-MCU memory connected to a CPU of the MCU by at least one interface. The MCU's memory-mapping configuration enables the at least one off-MCU memory to behave as an extension of at least one on-MCU memory that is connected directly to the CPU to effectively extend a range of the at least one on-MCU memory. The effective extended range of the at least one on-MCU memory enables the microcontroller-based instrument to utilize the complex application or protocol. Operation 420 includes operations 422 and 424. At operation 422, the MCU is configure with logic to control the memory mapping. At operation 424, the MCU is configured to use serial transmission for writing and/or reading addresses and/or data to and/or from the off-MCU memory.

Potential advantages include expanding a memory range of a highly integrated, low-power MCU used by an industrial instrument by accessing off-MCU memory using memory mapping. The memory range is expanded sufficient to enable the industrial instrument to use complex applications or protocols, and/or protocols that were previously not available to industrial instruments that are based on highly integrated, low-power MCUs due to their power constraints. Such low-power constraints can include an amount of power available to the MCU when powered via its Ethernet connection, without provision of power from an additional power source.

Additionally, the MCU can be programmed to use a minimal number of ports for exchanging data with the off-MCU memory by using serial transmission. In this way, more ports of the chip upon which MCU is deployed are available for I/O tasks that can support functionality of the industrial instrument without a need to increase the footprint of the MCU to accommodate functionality of the instrument.

From the concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above. Other possible features and advantages associated with the disclosed invention will be appreciated by one of ordinary skill in the art.

It is understood that embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein (e.g., industrial applications), but rather may be useful in substantially any application where it is desired to receive decision support for each step in an automated fashion. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Accordingly, it is submitted that that scope of the patent should not be limited to the described embodiments but rather should be limited only by the spirit and scope of the following claims.

I claim:

1. A method for using a memory-mapped memory in a microcontroller-based instrument, the method comprising:

operating the microcontroller-based instrument using a complex application or protocol;

operating a highly-integrated, low-power microcontroller unit (MCU) of the microcontroller-based instrument, wherein the MCU is deployed on a single chip and is configured to use memory mapping for accessing at least one off-MCU memory connected to a central processor unit (CPU) of the MCU by at least one interface, wherein the memory-mapping configuration of the MCU causes the CPU to have bus-cycle access to the at least one off-MCU memory and enables the at least one off-MCU memory to behave as an extension of at least one on-MCU memory that is connected directly to the CPU to effectively extend a range of the at least one on-MCU memory, and wherein the effective extended range of the at least one on-MCU memory enables the CPU of the MCU of the microcontroller-based instrument to utilize the bus-cycle access to the at least one off-MCU memory to perform direct execution, by the CPU of the MCU, of the complex application or protocol from the at least one off-MCU memory;

utilizing the memory mapping to emulate address lines and data lines for enabling the CPU of the MCU to access the at least one off-MCU memory via the bus-cycle access; and writing addresses and/or data to and/or reading addresses and/or data from, via the emulated address lines and data lines with the bus-cycle access, the at least one off-MCU memory using serial transmission during a memory mapped transaction.

2. The method of claim 1, wherein the complex application or protocol is an open platform communications unified architecture (OPC UA).

3. The method of claim 1, further comprising operating the MCU to control the microcontroller-based instrument to perform at least one of sensing a physical property, controlling and/or monitoring one or more devices that are external to the microcontroller-based instrument, actuating one or more second devices that are external to the microcontroller-based instrument, and communicating with one or more different microcontroller-based instruments of a first network and with a second network to which the MCU is connected.

4. The method of claim 1, wherein the microcontroller-based instrument is deployed in an industrial network.

5. The method of claim 1, wherein data is read from and/or written to the at least one off-MCU memory using the bus-cycle access.

6. The method of claim 1, wherein the method further comprises receiving power for all or a majority of electrical and electronic components of the microcontroller-based instrument via an Ethernet connection of the microcontroller-based instrument.

7. A method for configuring a microcontroller-based instrument, the method comprising:

configuring the microcontroller-based instrument with a complex application or protocol; and configuring a highly-integrated, low-power microcontroller unit (MCU) of the microcontroller-based instrument to use memory mapping for accessing at least one off-MCU memory connected to a central processor unit (CPU) of the MCU by at least one interface, wherein the MCU is deployed on a single chip and a memory-mapping configuration of the MCU causes the CPU to have bus-cycle access to the at least one off-MCU memory and enables the at least one off-MCU memory to behave as an extension of at least one on-MCU memory that is connected directly to the CPU to effectively extend a range of the at least one on-MCU memory, and wherein the effective extended range of the at least one on-MCU memory enables the CPU of the MCU of the microcontroller-based instrument to utilize the bus-cycle access to the at least one off-MCU memory to perform direct execution, by the CPU of the MCU, of the complex application or protocol from the at least one off-MCU memory, wherein configuring the MCU comprises:

configuring the MCU with logic to control the memory mapping;

configuring the MCU to utilize the memory mapping to emulate address lines and data lines for enabling the CPU of the MCU to access the at least one off-MCU memory via the bus-cycle access; and configuring the MCU to use serial transmission for writing and/or reading addresses and/or data to and/or from, via the emulated address lines and data lines with the bus-cycle access, the at least one off-MCU memory.

8. The method of claim 7, wherein the complex application or protocol is an open platform communications unified architecture (OPC UA).

9. The method of claim 7, wherein the MCU is configured at boot-time or before a first access by the MCU to the at least one off-MCU memory.

10. A microcontroller-based instrument, comprising:

an instrument module for performing an instrument task using complex-a complex application or protocol; and a highly integrated, low-power microcontroller unit (MCU) deployed on a single chip and configured to use the complex application or protocol, the MCU comprising:

a central processing unit (CPU);

at least one on-MCU memory directly connected to the CPU by an on-MCU data path;

at least one interface implemented as an on-MCU memory-mapped mode peripheral interface connected via the on-MCU data path to the CPU and configured to control memory mapping for writing addresses and/or data to and reading addresses and/or data from at least one off-MCU memory using serial transmission, wherein the memory-mapping is controlled to emulate address lines and data lines for enabling the CPU of the MCU to access the at least one off-MCU memory via bus-cycle access and enable the at least one off-MCU memory to behave as an extension of the at least one on-MCU memory, and to effectively extend a range of the at least one on-MCU memory, wherein the effective extended range of the at least one on-MCU memory enables the MCU to use the bus-cycle access to the at least one off-MCU memory to perform direct execution, by the CPU of the MCU, of the complex application or protocol from the at least one off-MCU memory;

a plurality of ports via which the addresses, the data, and control signals are exchanged via serial transmission with the at least one off-MCU memory during memory mapped transactions; and the at least one off-MCU memory coupled to the CPU via the at least one interface and the plurality of ports.

11. The microcontroller-based instrument of claim 10, wherein the complex application or protocol is an open platform communications unified architecture (OPC UA).

12. The microcontroller-based instrument of claim 10, wherein the instrument module includes at least one of a sensor circuit configured to sense a physical property, a controller or monitor circuit configured to control or monitor one or more devices that are external to the microcontroller-based instrument, an actuator circuit configured to actuate one or more second devices that are external to the microcontroller-based instrument, and an edge device configured to communicate with one or more different devices of a first network and with a second network to which the MCU is connected.

13. The microcontroller-based instrument of claim 10, wherein the microcontroller-based instrument is deployed in an industrial network.

14. The microcontroller-based instrument of claim 10, wherein data is directly read from and/or written to the at least one off-MCU memory using the bus-cycle access.

15. The microcontroller-based instrument of claim 10, further comprising an Ethernet connection, wherein power for all or a majority of electrical and electronic components of the microcontroller-based instrument is sourced via the Ethernet connection.

16. The microcontroller-based instrument of claim 11, wherein the at least one on-MCU memory includes on-MCU read-only memory (ROM) and on-MCU read-write memory (RAM), and the at least one off-MCU memory includes off-MCU ROM that increases the on-MCU ROM to about 64 Mbyte or more and off-MCU RAM that increases the on-MCU RAM to about 8.0 Mbyte or more.

17. The microcontroller-based instrument of claim 11, wherein the at least one off-MCU memory includes off-MCU ROM read-only memory (ROM) and off-MCU read-write memory (RAM), and memory mapped transactions between the at least one on-MCU memory and the at least one off-MCU memory for reading addresses and/or data from the off-MCU ROM use no more than eleven input/output pins of the MCU and for reading and writing addresses and/or data to and from the off-MCU RAM use no more than eleven input/output pins of the MCU.

18. The microcontroller-based instrument of claim 11, wherein the at least one off-MCU memory includes an off-MCU read-write memory (RAM) and an off-MCU read-only memory (ROM), and the at least one interface includes a first interface that connects the CPU to the off-MCU ROM and a second interface that connects the CPU to the off-MCU RAM.

19. The microcontroller-based instrument of claim 10, wherein the at least one interface is configured to operate in a memory-mapped mode based on receiving a user selection of the memory-mapped mode from a menu of different modes.

20. The method of claim 1, further comprising operating in a memory-mapped mode based on receiving a user selection of the memory-mapped mode from a menu of different modes.

* * * * *